(12) United States Patent
Molinari et al.

(10) Patent No.: US 12,391,279 B2
(45) Date of Patent: Aug. 19, 2025

(54) METHOD FOR ENUMERATING HOMOTOPIES FOR MANEUVERS USING A HIERARCHY OF TOLERANCE RELATIONS

(71) Applicant: TOYOTA RESEARCH INSTITUTE, INC., Los Altos, CA (US)

(72) Inventors: Daniele Molinari, Redwood City, CA (US); Constantin Hubmann, Menlo Park, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 164 days.

(21) Appl. No.: 17/316,618

(22) Filed: May 10, 2021

(65) Prior Publication Data

US 2022/0355822 A1    Nov. 10, 2022

(51) Int. Cl.
*B60W 60/00* (2020.01)
*B60W 30/09* (2012.01)
*B60W 30/18* (2012.01)

(52) U.S. Cl.
CPC ........ *B60W 60/0015* (2020.02); *B60W 30/09* (2013.01); *B60W 30/18163* (2013.01)

(58) Field of Classification Search
CPC .............................. B60W 60/00; B60W 30/00
See application file for complete search history.

(56) References Cited

U.S. PATENT DOCUMENTS

| | | | | |
|---|---|---|---|---|
| 9,712,423 | B1* | 7/2017 | Amis | H04L 45/125 |
| 10,471,954 | B2* | 11/2019 | Saiki | B60W 30/0956 |
| 10,710,581 | B2* | 7/2020 | Düring | B60W 30/0953 |
| 11,352,071 | B1* | 6/2022 | Ebrahimi Afrouzi | G05D 1/0217 |
| 11,555,706 | B1* | 1/2023 | Levihn | G05D 1/0088 |
| 2014/0236428 | A1* | 8/2014 | Akiyama | G08G 1/165 701/42 |
| 2016/0375901 | A1* | 12/2016 | Di Cairano | B60W 30/09 701/26 |
| 2018/0345957 | A1* | 12/2018 | Ohmura | B60W 30/095 |
| 2019/0042859 | A1* | 2/2019 | Schubert | G05D 1/0088 |
| 2019/0056743 | A1* | 2/2019 | Alesiani | G01C 21/005 |
| 2019/0250617 | A1* | 8/2019 | Ford | G05D 1/0212 |
| 2020/0026283 | A1* | 1/2020 | Barnes | G06V 20/58 |
| 2020/0031340 | A1* | 1/2020 | Tao | G05D 1/0223 |
| 2020/0062244 | A1* | 2/2020 | Iimura | B60W 30/095 |
| 2020/0110414 | A1* | 4/2020 | Dupre | B60W 60/0011 |
| 2020/0353917 | A1* | 11/2020 | Leitermann | B60W 30/09 |

(Continued)

OTHER PUBLICATIONS

Merriam-Webster, "Enumerate", Mar. 9, 2021, Merriam-Webster.com Dictionary (Year: 2021).*
Nykamp DQ, "Edge definition", May 8, 2021, Math Insight, http://mathinsight.org/definition/network_edge (Year: 2021).*
Bhattacharya, et al., "Topological Constraints in Search Based Robot Path Planning", The International Journal of Robotics Research. 2019;38(8):981-1009.
Gu, et al., "Automated Tactical Maneuver Discovery Reasoning and Trajectory Planning for Autonomous Driving", Doctoral Thesis, Carnegie Melon University, May 2017.

(Continued)

*Primary Examiner* — Aniss Chad
*Assistant Examiner* — Elizabeth J Slowik
(74) *Attorney, Agent, or Firm* — SEYFARTH SHAW LLP

(57) ABSTRACT

A method of motion planning and maneuvering of an ego vehicle is described. The method includes determining a plurality of vehicle trajectories during motion planning of the ego vehicle. The method also includes enumerating the plurality of vehicle trajectories associated with a plurality of vehicle maneuvers into a qualitatively equivalent set of vehicle maneuvers. The method further includes performing a vehicle control action according to a selected one of the qualitatively equivalent set of vehicle maneuvers.

13 Claims, 8 Drawing Sheets

(56) References Cited

U.S. PATENT DOCUMENTS

| | | |
|---|---|---|
| 2021/0020045 A1 | 1/2021 | Huang et al. |
| 2021/0108936 A1* | 4/2021 | Seegmiller ...... B60W 60/00276 |
| 2021/0114617 A1* | 4/2021 | Phillips ............. B60W 30/0956 |
| 2021/0129871 A1* | 5/2021 | Malla ......................... G06T 7/70 |
| 2022/0176985 A1* | 6/2022 | Ota ..................... B60W 60/001 |
| 2022/0219727 A1* | 7/2022 | Floor .................. B60W 30/095 |
| 2022/0250641 A1* | 8/2022 | Seegmiller .......... G01C 21/3407 |
| 2023/0219585 A1* | 7/2023 | Eiras .................... G05D 1/0214 |
| | | 701/25 |

OTHER PUBLICATIONS

Bhattacharya, et al., "Search-Based Path Planning with Homotopy Class Constraints." Proceedings of the AAAI Conference on Artificial Intelligence, vol. 24, No. 1. 2010.

Gu, et al., "Improved Trajectory Planning for On-Road Self-Driving Vehicles Via Combined Graph Search, Optimization & Topology Analysis", Ph.D. diss., Carnegie Mellon University, 2017.

Schulz, et al., "Estimation of Collective Maneuvers Through Cooperative Multi-Agent Planning", 2017 IEEE Intelligent Vehicles Symposium (IV), pp. 624-631. IEEE, 2017.

Liu, et al., "Homotopy Based Optimal Configurtion Space Reduction for Anytime Robotic Motion Planning", Chinese Journal of Aeronautics 34, No. 1 (2021): 364-379.

* cited by examiner

METHOD FOR ENUMERATING HOMOTOPIES FOR MANEUVERS USING A HIERARCHY OF TOLERANCE RELATIONS

BACKGROUND

Field

Certain aspects of the present disclosure generally relate to autonomous vehicle technology and, more particularly, to enumerating homotopies for maneuvers using a hierarchy of tolerance relations.

Background

Autonomous agents (e.g., vehicles, robots, etc.) rely on machine vision for sensing a surrounding environment by analyzing areas of interest in a scene from images of the surrounding environment. Although scientists have spent decades studying the human visual system, a solution for realizing equivalent machine vision remains elusive. Realizing equivalent machine vision is a goal for enabling truly autonomous agents. Machine vision, however, is distinct from the field of digital image processing. In particular, machine vision involves recovering a three-dimensional (3D) structure of the world from images and using the 3D structure for fully understanding a scene. That is, machine vision strives to provide a high-level understanding of a surrounding environment, as performed by the human visual system.

Autonomous agents, such as driverless cars and robots, are quickly evolving and have become a reality in this decade. Because autonomous agents have to interact with humans, however, many critical concerns arise. For example, how to design vehicle control of an autonomous vehicle using machine learning. Unfortunately, vehicle control by machine learning is less effective in complicated traffic environments involving complex interactions between vehicles (e.g., a situation where a controlled (ego) vehicle merges/changes onto/into a traffic lane).

Machine learning techniques for vehicle control using a network to select a vehicle control action for an ego vehicle are desired. For example, a selected speed/acceleration/steering angle of the ego vehicle may be applied as a vehicle control action. Conventional machine learning techniques are based on trajectory regression and do not consider the use of homotopy classes for motion planning or maneuvering.

SUMMARY

A method of motion planning and maneuvering of an ego vehicle is described. The method includes determining a plurality of vehicle trajectories during motion planning of the ego vehicle. The method also includes enumerating the plurality of vehicle trajectories associated with a plurality of vehicle maneuvers into a qualitatively equivalent set of vehicle maneuvers. The method further includes performing a vehicle control action according to a selected one of the qualitatively equivalent set of vehicle maneuvers.

A non-transitory computer-readable medium having program code recorded thereon for motion planning and maneuvering of an ego vehicle is described. The program code is executed by a processor. The non-transitory computer-readable medium includes program code to determine a plurality of vehicle trajectories during motion planning of the ego vehicle. The non-transitory computer-readable medium also includes program code to enumerate the plurality of vehicle trajectories associated with a plurality of vehicle maneuvers into a qualitatively equivalent set of vehicle maneuvers. The non-transitory computer-readable medium further includes program code to perform a vehicle control action according to a selected one of the qualitatively equivalent set of vehicle maneuvers.

A system for motion planning and maneuvering of an ego vehicle is described. The system includes a vehicle trajectory/tolerance module to determine a plurality of vehicle trajectories during motion planning of the ego vehicle. The system also includes a vehicle maneuver enumeration module to enumerate the plurality of vehicle trajectories associated with a plurality of vehicle maneuvers into a qualitatively equivalent set of vehicle maneuvers. The system further includes a vehicle control selection module to perform a vehicle control action according to a selected one of the qualitatively equivalent set of vehicle maneuvers.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
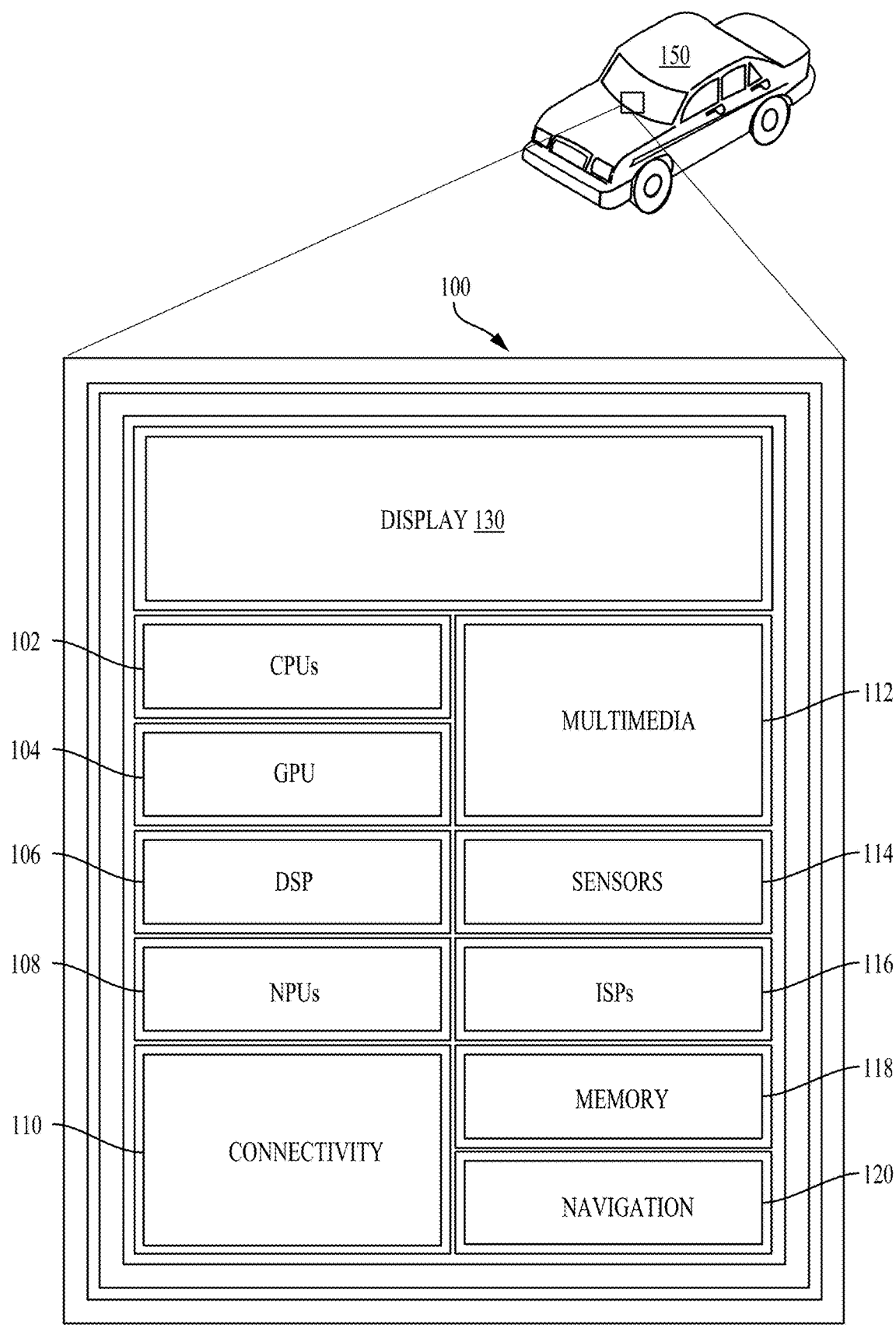
FIG. 1 illustrates an example implementation of designing a neural network using a system-on-a-chip (SOC) for a vehicle behavior control system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Traffic congestion on highways affects millions of people and presents an urgent problem to solve. In particular, vehicles at highway merging sections (e.g., such as on-ramp and land-drop bottlenecks) perform lane changes, which may generate traffic oscillations and extra congestion. Both main-lane and on-ramp traffic are potentially congested due to irregular lane change behavior and unexpected braking maneuvers of surrounding vehicles. Automated vehicles are expected to reduce traffic accidents and improve traffic efficiency. In particular, automation of vehicle control on highways is rapidly advancing, which may eventually reduce traffic accidents and improve traffic efficiency.

Reducing traffic congestion may be achieved by effectively directing timing and speed of controlled vehicles. For example, the timing and speed of vehicles is controlled when maneuvering in traffic in a manner that does not detrimentally affect traffic on the roadway. According to one aspect of the present disclosure, a vehicle behavior control system is described for motion planning and maneuvering of a controlled (ego) vehicle, while reducing the traffic impact on the roadway.

Vehicle control by machine learning is less effective in complicated traffic environments. For example, these traffic environments may involve complex interactions between vehicles, including situations where a controlled (ego) vehicle maneuvers into and out of traffic lanes. Conventional machine learning techniques for vehicle control may use a network to select an appropriate vehicle control action from input data relative to the ego vehicle. For example, a selected speed/acceleration/steering angle of the controlled (ego) vehicle may be applied as a vehicle control action to perform a vehicle control maneuver. Unfortunately, conventional machine learning techniques do not consider homotopy classes for motion planning and maneuvering for selecting vehicle control actions.

For example, when an autonomous vehicle (AV) is driving on a roadway with multiple lanes, conventional approaches plan actions at discrete time intervals. Unfortunately, conventional approaches of planning actions at discrete time intervals result in a mesh of potential trajectories for the autonomous vehicle. Some of these trajectories, however, result in qualitatively equivalent maneuvers. As described, qualitatively equivalent maneuvers may refer to driving maneuvers that belong to the same homotopy class, as determined by a vehicle perception system. The vehicle perception system can include a number of different sensors, such as cameras, a light detection and ranging (LIDAR) sensor or a radio detection and ranging (RADAR) sensor, sonar, or other like sensor.

Aspects of the present disclosure enumerate homotopies or homotopy classes according to a hierarchy of tolerance relations for autonomous vehicles (AV). A homotopy may be a set of trajectories with a similar high-level navigation decision. As described, a tolerance relation may be a binary predicate that is symmetric and reflexive. A tolerance relation is not necessarily transitive. Finding homotopy classes is a problem of practical interest because it allows an autonomous vehicle to reason about a small set of qualitative maneuvers rather than a large number of single trajectories. Aspects of the present disclosure are directed to a method for homotopy enumeration based on the noted hierarchy of tolerance relations.

FIG. 1 illustrates an example implementation of the aforementioned system and method for a vehicle behavior control system using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle behavior control action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include program code to determine one or more merge gaps between vehicles in a target lane of a multilane highway based on images processed by the sensor processor 114. The instructions loaded into a processor (e.g., CPU 102) may also include program code to compute an exposure time in which the ego vehicle is specified to merge into the one or merge gaps, and program code to select a merge gap between a first vehicle and a second vehicle in the target lane of the multilane highway having a maximum exposure time.

Figure 2:
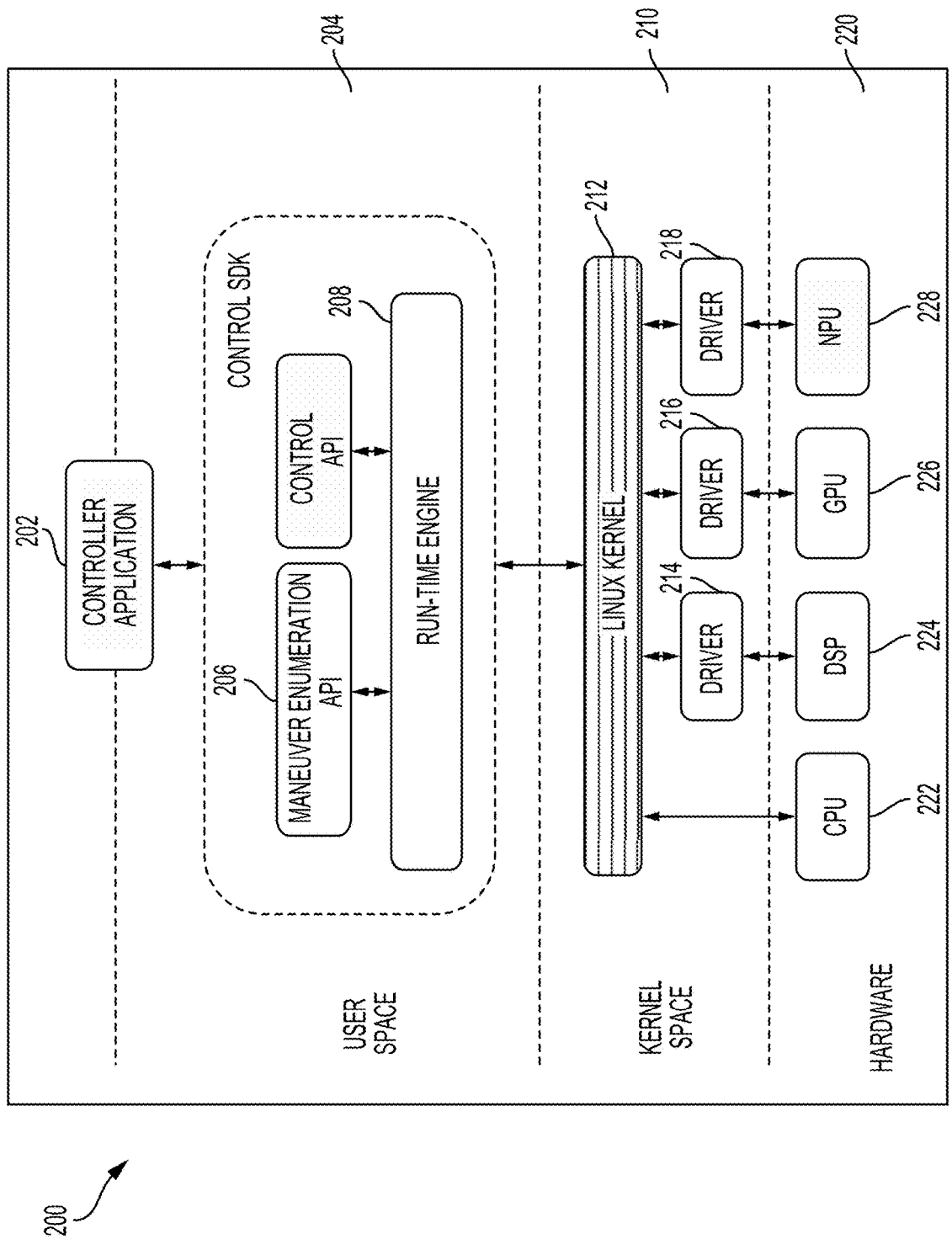
FIG. 2 is a block diagram illustrating a software architecture that may modularize artificial intelligence (AI) functions for a vehicle behavior control system of an autonomous agent, according to aspects of the present disclosure.

FIG. 2 is a block diagram illustrating a software architecture 200 that may modularize artificial intelligence (AI) functions for selecting a vehicle control action of an autonomous agent using a temporal component of a current traffic state, according to aspects of the present disclosure. Using the architecture, a controller application 202 may be designed such that it may cause various processing blocks of a system-on-a-chip (SOC) 220 (for example a CPU 222, a DSP 224, a GPU 226, and/or an NPU 228) to perform supporting computations during run-time operation of the controller application 202. While FIG. 2 describes the software architecture 200 for selecting a vehicle control action of an autonomous agent, it should be recognized that vehicle action control functionality is not limited to autonomous agents. According to aspects of the present disclosure, vehicle action control functionality is applicable to any vehicle type, provided the vehicle is equipped with appropriate functions (e.g., vehicle-to-vehicle (V2V) communication) of connected vehicle applications and/or an advanced driver assistance system (ADAS).

The controller application 202 may be configured to call functions defined in a user space 204 that may, for example, provide for vehicle action control services. The controller application 202 may make a request to compile program code associated with a library defined in a maneuver enumeration application programming interface (API) 206 to perform a vehicle behavior action control selection. Selection of the vehicle behavior control action may ultimately rely on the output of a convolutional neural network configured to select a vehicle control action of an autonomous agent using a small set of qualitative maneuvers.

A run-time engine 208, which may be compiled code of a runtime framework, may be further accessible to the controller application 202. The controller application 202 may cause the run-time engine 208, for example, to take actions for controlling the autonomous agent. When an ego vehicle intends to merge onto a traffic lane, the run-time engine 208 may in turn send a signal to an operating system 210, such as a Linux Kernel 212, running on the SOC 220. FIG. 2 illustrates the Linux Kernel 212 as software architecture for implementing control of an autonomous agent using temporal traffic state information. It should be recognized, however, aspects of the present disclosure are not limited to this exemplary software architecture. For example, other kernels may be used to provide the software architecture to support vehicle control action selection functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
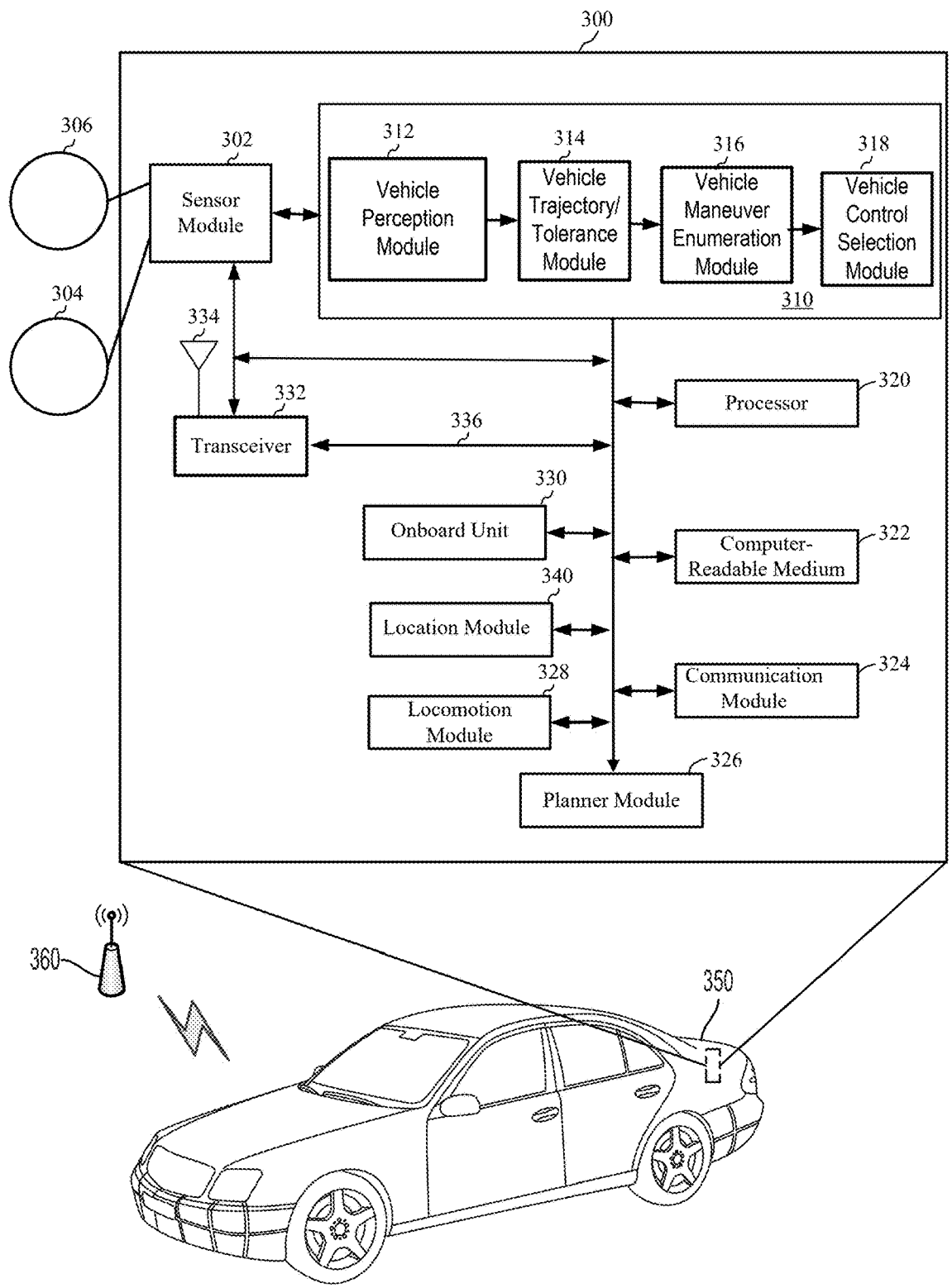
FIG. 3 is a diagram illustrating an example of a hardware implementation for a vehicle behavior control system, according to aspects of the present disclosure.

FIG. 3 is a diagram illustrating an example of a hardware implementation for a vehicle behavior control system 300, according to aspects of the present disclosure. The vehicle behavior control system 300 may be configured for improved maneuver selection for an ego vehicle. The vehicle behavior control system 300 may be a component of a vehicle, a robotic device, or other non-autonomous device (e.g., non-autonomous vehicles, ride-share cars, etc.). For example, as shown in FIG. 3, the vehicle behavior control system 300 is a component of a car 350.

Aspects of the present disclosure are not limited to the vehicle behavior control system 300 being a component of the car 350. Other devices, such as a bus, motorcycle, or other like non-autonomous vehicle, are also contemplated for implementing the vehicle behavior control system 300. In this example, the car 350 may be autonomous or semi-autonomous; however, other configurations for the car 350 are contemplated, such as an advanced driver assistance system (ADAS).

The vehicle behavior control system 300 may be implemented with an interconnected architecture, represented generally by an interconnect 336. The interconnect 336 may include any number of point-to-point interconnects, buses, and/or bridges depending on the specific application of the vehicle behavior control system 300 and the overall design constraints. The interconnect 336 links together various circuits including one or more processors and/or hardware modules, represented by a sensor module 302, a vehicle behavior controller 310, a processor 320, a computer-readable medium 322, a communication module 324, a planner module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The vehicle behavior control system 300 includes a transceiver 332 coupled to the sensor module 302, the vehicle behavior controller 310, the processor 320, the computer-readable medium 322, the communication module 324, the planner module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle behavior controller 310 to/from connected vehicles within the vicinity of the car 350.

The vehicle behavior control system 300 includes the processor 320 coupled to the computer-readable medium 322. The processor 320 performs processing, including the execution of software stored on the computer-readable medium 322 to provide functionality according to the disclosure. The software, when executed by the processor 320, causes the vehicle behavior control system 300 to perform the various functions described for vehicle behavior control (e.g., vehicle merging control) of the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle behavior controller 310, the communication module 324, the planner module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)-compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the car 350 that are not modules of the vehicle behavior control system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle behavior control system 300 also includes the planner module 326 for planning a route and controlling the locomotion of the car 350, via the locomotion module 328 for autonomous operation of the car 350. In one configuration, the planner module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle behavior controller 310 may be in communication with the sensor module 302, the processor 320, the computer-readable medium 322, the communication module 324, the planner module 326, the locomotion module 328, the location module 340, the onboard unit 330, and the transceiver 332. In one configuration, the vehicle behavior controller 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the vehicle behavior controller 310 may receive sensor data directly from the first sensor 306 and the second sensor 304 to determine, for example, input traffic data images.

Conventional machine learning techniques for vehicle control may use a network to select an appropriate vehicle control action from input data relative to the ego vehicle as determined by a vehicle perception system. The vehicle perception system can include a number of different sensors, such as cameras, a light detection and ranging (LIDAR) sensor or a radio detection and ranging (RADAR) sensor, sonar, or other like sensor. During operation of the car 350, a selected speed/acceleration/steering angle of the controlled (ego) vehicle may be applied as a vehicle control action to perform a vehicle control maneuver. Unfortunately, conventional machine learning techniques use trajectory regression techniques and do not consider homotopy classes for motion planning and maneuvering to select the vehicle control actions.

For example, when an autonomous vehicle (AV), such as the car 350, is driving on a roadway with multiple lanes, conventional approaches plan actions at discrete time intervals. Unfortunately, conventional approaches of planning actions at discrete time intervals result in a mesh of potential trajectories for the autonomous vehicle. Some of these trajectories, however, result in qualitatively equivalent maneuvers. As described, qualitatively equivalent maneuvers may refer to driving maneuvers that belong to the same homotopy class in relation to the relevant road users and entities, as determined by a vehicle perception system.

As shown in FIG. 3, the vehicle behavior controller 310 includes a vehicle perception module 312, a vehicle trajectory/tolerance module 314, a vehicle maneuver enumeration module 316, and a vehicle control selection module 318. The vehicle perception module 312, the vehicle trajectory/tolerance module 314, the vehicle maneuver enumeration module 316, and the vehicle control selection module 318 may be components of a same or different artificial neural network, such as a deep convolutional neural network (CNN). The vehicle behavior controller 310 is not limited to a CNN. The vehicle behavior controller 310 receives a data stream from the first sensor 306 and/or the second sensor 304. The data stream may include a 2D RGB image from the first sensor 306 and LIDAR data points from the second sensor 304. The data stream may include multiple frames, such as image frames of traffic data.

The vehicle trajectory/tolerance module 314 and the vehicle maneuver enumeration module 316 may be configured to enumerate a set of trajectories with a similar high-level navigation decision into homotopy classes according to a hierarchy of tolerance relations for the car 350. Finding homotopy classes is a problem of practical interest because it allows the vehicle control selection module 318 to reason about a small set of qualitative maneuvers rather than a large number of single trajectories. For example, a vehicle control behavior of the car 350 may be controlled by the vehicle behavior controller 310 in a manner for motion planning and maneuvering of the car 350 based on a reduced set of qualitative maneuvers rather than a large number of single trajectories, for example, as shown in FIG. 4.

Figure 4:
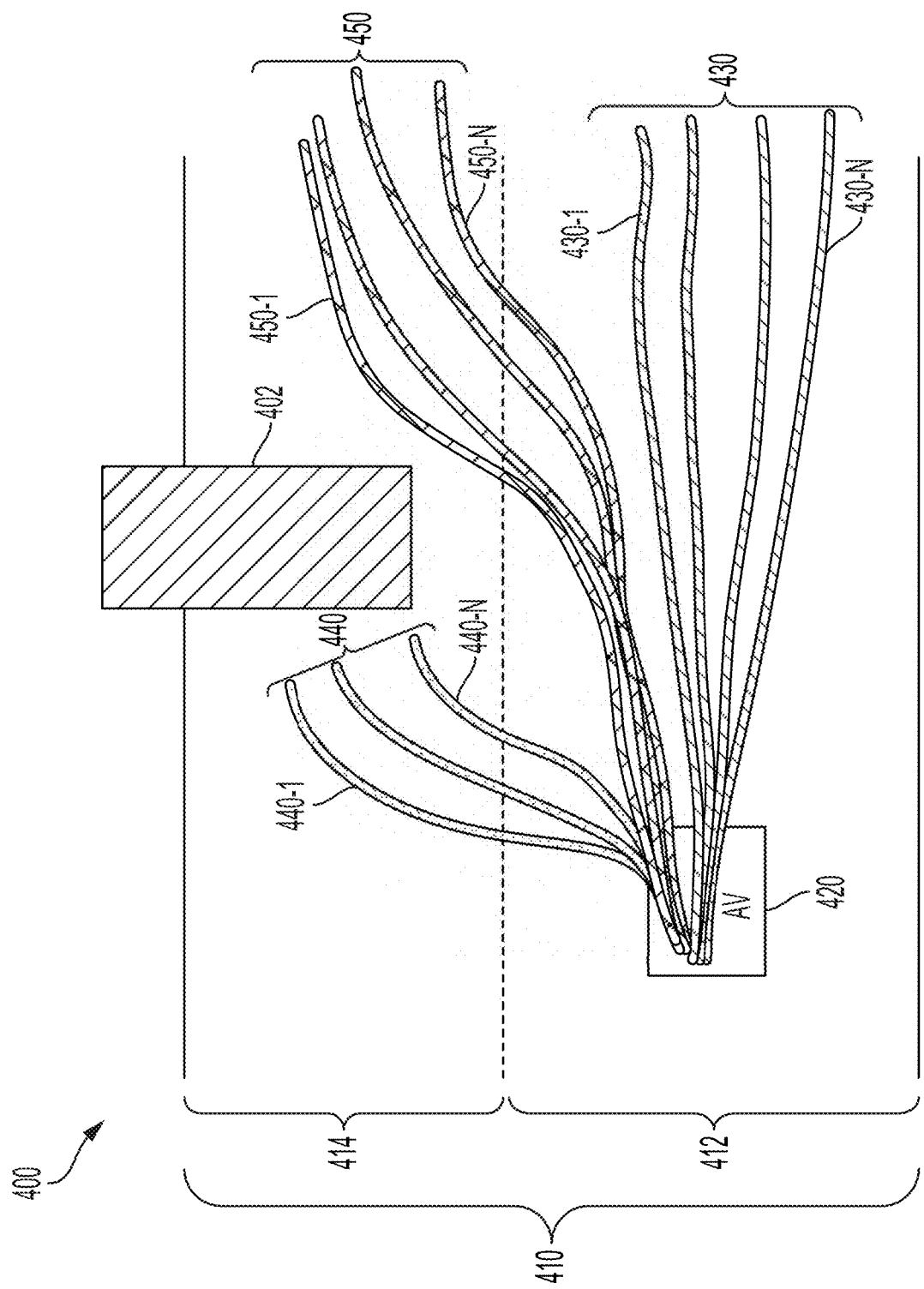
FIG. 4 is a diagram illustrating an overview of a roadway environment, including an obstruction in a second lane of a roadway and a controlled (ego) vehicle in a first lane of the roadway, according to aspects of the present disclosure.

FIG. 4 is a diagram illustrating an overview of a roadway environment, including an obstruction in a second lane of a roadway and a controlled (ego) vehicle in a first lane of the roadway, according to aspects of the present disclosure. In this example, a roadway environment 400 includes a roadway 410, having a first lane 412 in which an ego vehicle 420 is traveling into a second lane 414 in which an obstruction 402 is present. In this example, the ego vehicle 420 is configured to monitor the dynamics of both vehicles/obstructions in the first lane 412, as well as vehicles/obstructions in the second lane 414 of the roadway 410. In this example, the ego vehicle 420, may be the car 350, shown in FIG. 3.

In one aspect of the present disclosure, the ego vehicle 420 is essentially controlled by a vehicle controller (e.g., the vehicle behavior controller 310). In this example, the ego vehicle 420 (e.g., the vehicle perception module 312) identifies the obstruction 402 in the second lane 414 of the roadway 410. That is, the ego vehicle 420 is configured to identify maneuver homotopies to avoid the obstruction 402 in the second lane 414 of the roadway 410. According to aspects of the present disclosure, the ego vehicle 420 is configured to enumerate trajectories that result in a set of qualitatively equivalent maneuvers, which are referred to as trajectories belonging to the same homotopy class.

In this example, the roadway 410 is shown with two lanes, in which the ego vehicle 420 is in the rightmost lane (e.g., the first lane 412) and roadwork (e.g., the obstruction 402) is blocking the left lane (e.g., the second lane 414). In this situation, there are three possible maneuver homotopies. A first maneuver homotopy 430 is continuing in the right lane (e.g., the first lane 412). A second maneuver homotopy 440 is changing lanes to the left lane (e.g., the second lane 414) before the roadwork (e.g., the obstruction 402) and getting stuck. A third maneuver homotopy 450 is changing lanes after the roadwork (e.g., the obstruction 402) and continuing in the left lane (e.g., the second lane 414). In this example, the first maneuver homotopy 430 is composed of various trajectories (e.g., 430-1, . . . , 430-N). In addition, the second maneuver homotopy 440 is composed of various trajectories (e.g., 440-1, . . . , 440-N). Similarly, the third maneuver homotopy 450 is composed of various trajectories (e.g., 450-1, . . . , 450-N).

The ego vehicle 420 may be configured to determine a finite set of homotopy classes for enabling a vehicle behavior controller to reason about a reduced set of qualitatively equivalent maneuvers rather than a large number of single trajectories. In operation, the vehicle controller (e.g., vehicle control selection module 318 of FIG. 3) adjusts a speed and a trajectory of the ego vehicle 420 to perform a selected maneuver for a set of qualitatively equivalent maneuvers. In this example, if a target speed and/or trajectory of the ego vehicle 420 is not safe, the vehicle controller ignores the target speed and/or the trajectory and selects a different motion plan. Therefore, a collision avoidance function is provided by the vehicle controller (e.g., vehicle behavior controller 310 of FIG. 3).

Figure 5:
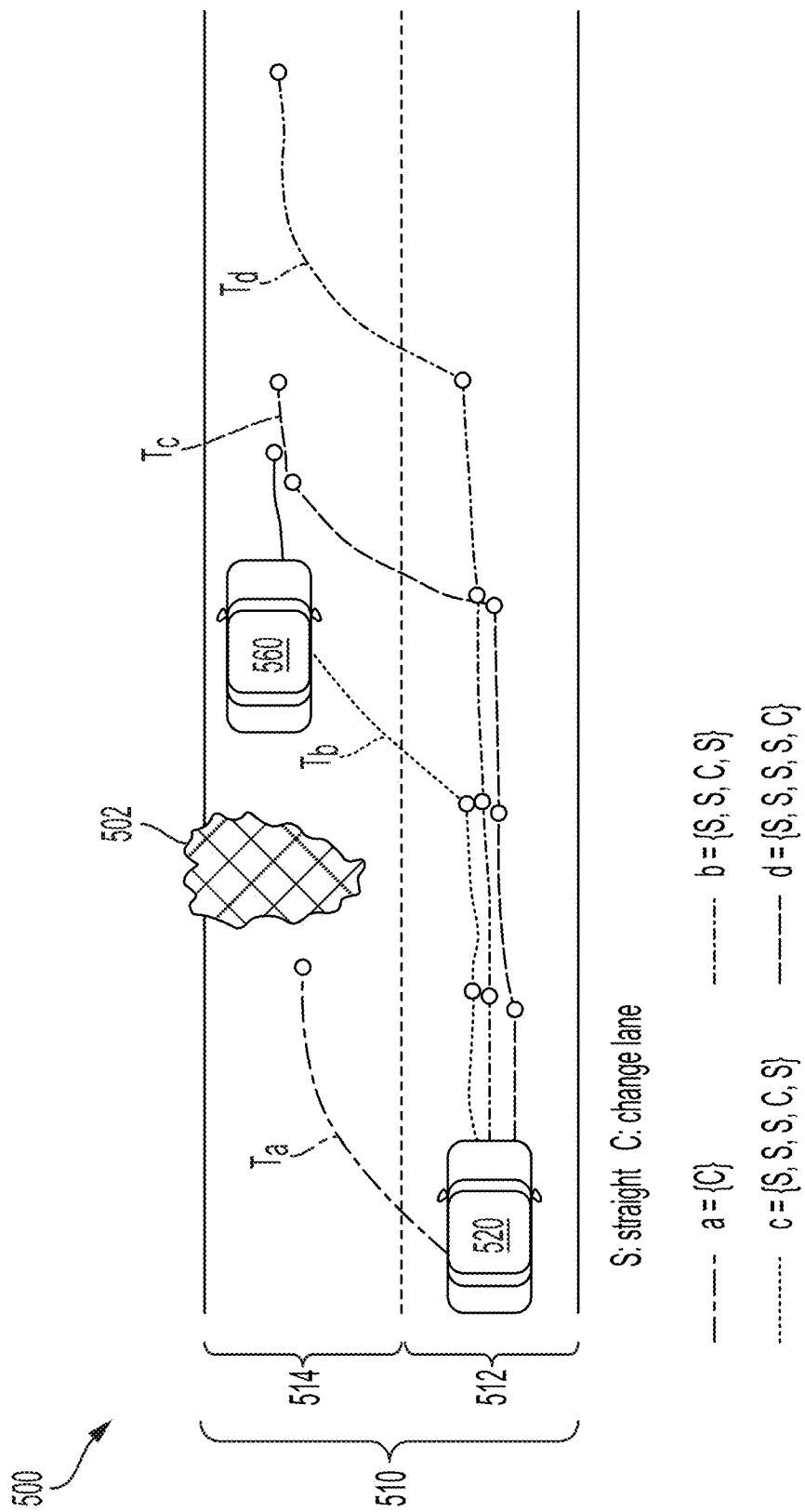
FIG. 5 is a diagram illustrating an overview of a roadway environment, including an obstruction and a slow moving vehicle in a second lane of a roadway and a controlled (ego) vehicle in a first lane of the roadway, according to aspects of the present disclosure.

FIG. 5 is a diagram illustrating an overview of a roadway environment, including an obstruction and a slow moving vehicle in a second lane of a roadway and an ego vehicle in a first lane of the roadway, according to aspects of the present disclosure. In this example, a roadway environment 500 includes a roadway 510, having a first lane 512 in which an ego vehicle 520 is traveling into a second lane 514 in which an obstruction 502 is present, as well as a slow moving vehicle 560. In this example, the ego vehicle 520 is also configured to monitor the dynamics of both vehicles/obstructions in the first lane 512, as well as vehicles/obstructions in the second lane 514 of the roadway 510. In this example, the ego vehicle 520 may be the car 350, shown in FIG. 3.

In one aspect of the present disclosure, the ego vehicle 520 is controlled by a vehicle controller (e.g., the vehicle behavior controller 310). In this example, the ego vehicle 520 (e.g., the vehicle perception module 312) identifies the obstruction 502 and the slow moving vehicle 560 in the second lane 514 of the roadway 510. That is, the ego vehicle 520 is configured to identify maneuver homotopies (e.g., qualitatively equivalent trajectories) to avoid the obstruction 502 and/or the slow moving vehicle 560 in the second lane 514 of the roadway 510. According to aspects of the present disclosure, the ego vehicle 520 is configured to enumerate trajectories that result in a set of qualitatively equivalent maneuvers, which are referred to as trajectories belonging to the same homotopy class.

In this example, the roadway 510 is shown with two lanes, in which the ego vehicle 520 is in the rightmost lane (e.g., the first lane 512) and roadwork (e.g., the obstruction 502) is blocking the left lane (e.g., the second lane 514), as well as the slow moving vehicle 560. In this situation, four possible maneuvers are shown as vehicle trajectories $T_a$, $T_b$, $T_c$, and $T_d$. A first maneuver involves the trajectory $T_a$, in which the ego vehicle 520 changes lanes to the left lane (e.g., the second lane 514) before the roadwork (e.g., the obstruction 502) and gets stuck. A second maneuver involves the trajectory $T_b$, in which the ego vehicle 520 changes lanes further down after the roadwork (e.g., the obstruction 502), but still before the slow moving vehicle, and still gets stuck behind the slow moving vehicle 560 in the left lane (e.g., the second lane 514). A third maneuver involves the trajectory $T_c$, in which the ego vehicle 520 changes lanes after the roadwork (e.g., the obstruction 502) and, possibly after the slow moving vehicle 560, continues in the left lane (e.g., the second lane 514). A forth-fourth maneuver involves the trajectory $T_d$, in which the ego vehicle 520 changes lanes after the roadwork (e.g., the obstruction 502) and after the slow moving vehicle 560 and continues in the left lane (e.g., the second lane 514).

Aspects of the present disclosure are directed to a method for homotopy enumeration based on a hierarchy of tolerance relations, in which a tolerance relation may be a binary predicate that is symmetric and reflexive, but not necessarily transitive. For example, in FIG. 5, the trajectories (e.g., $T_a$, $T_b$, $T_c$, and $T_d$) have both a set of points and a "discrete description" of the actions performed to achieve the trajectory for the ego vehicle 520. In this example, the trajectory $T_a$ includes the single action of a lane change (c), such that $T_a=\{c\}$. In addition, the trajectory $T_b$ includes the actions of continuing straight(s), continuing straight(s), a lane change (c), and continuing straight(s), such that $T_b=\{s, s, c, s\}$. Similarly, the trajectory $T_c$ includes the actions of continuing straight(s), continuing straight(s), continuing straight(s), a lane change (c), and continuing straight(s), such that $T_c=\{s, s, s, c, s\}$. A fourth maneuver involves the trajectory $T_d$, in which the ego vehicle 520 changes lanes after the roadwork (e.g., the obstruction 502) and after the slow moving vehicle 560 and continues in the left lane (e.g., the second lane 514). In addition, the trajectory $T_d$ includes the actions of continuing straight(s), continuing straight(s), continuing straight (s), continuing straight(s), and a lane change (c), such that Td={s, s, s, s, c}. One implementation of the disclosed method for homotopy enumeration based on a hierarchy of tolerance relations may be performed as shown in FIG. 6.

Figure 6:
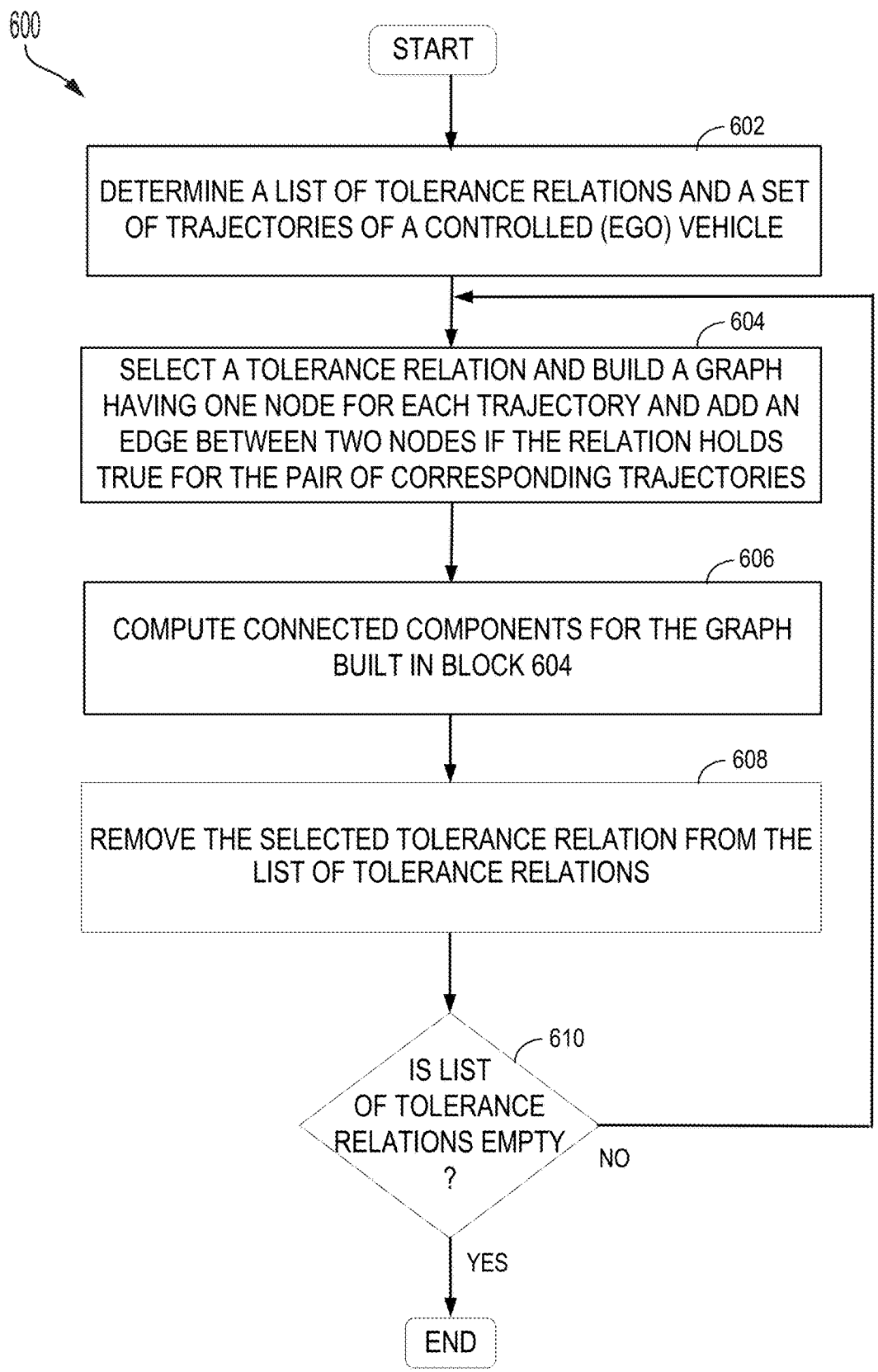
FIG. 6 is a flowchart illustrating a method of determining a homotopy class for motion planning and maneuvering of an ego vehicle, according to aspects of the present disclosure.

FIG. 6 is a flowchart illustrating a method of determining a homotopy class for motion planning and maneuvering of an ego vehicle, according to aspects of the present disclosure. A method 600 begins at block 602, in which a list of tolerance relations and a set of trajectories are determined for a controlled (ego) vehicle. For example, as shown in FIG. 5, the ego vehicle 520 is shown with four possible maneuvers shown as vehicle trajectories $T_a$, $T_b$, $T_c$, and $T_d$ during motion planning of the ego vehicle 520. The method 600 is further described with references to trajectory graphs shown in FIGURE-FIGS. 7A and 7B for determining a homotopy class, according to aspects of the present disclosure.

At block 604, a tolerance relation is selected and a graph is built having one node for each trajectory and add an edge between two nodes if the relation holds true for the pair of corresponding trajectories. For example, as shown in FIG. 5, the trajectories (e.g., $T_a$, $T_b$, $T_c$, and $T_d$) have both a set of points and a "discrete description" of the actions performed by the ego vehicle 520 to achieve the trajectory. In this example, two tolerance relations are described to enumerate the maneuver homotopies: (1) Similar (x, y); and (2) Close (x, y). Similar (x, y) is a first tolerance relation specifying trajectories are similar if x and y have the same number of 'c' actions and their positions in the description differ at most by one place. Close (x, y) is the second tolerance relation specifying that trajectories are close if x and y have final points that are closer than five meters. Although two tolerance relations are shown, it should be recognized that fewer or an additional number of tolerance relations are contemplated according to aspects of the present disclosure.

Figure 7A:
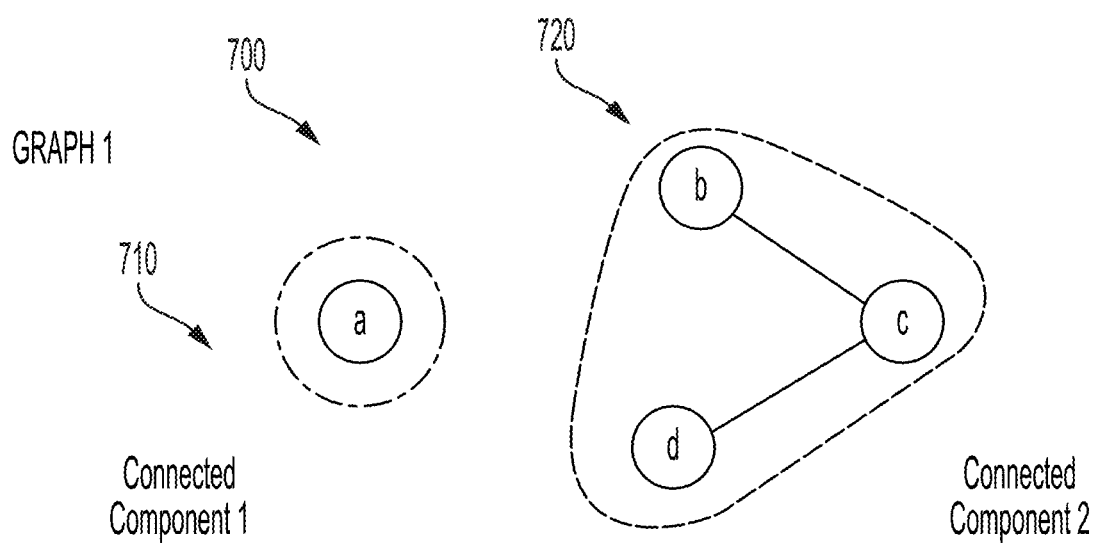
FIGS. 7A and 7B are block diagrams illustrating trajectory graphs for determining a homotopy class, according to aspects of the present disclosure.
Figure 7B:
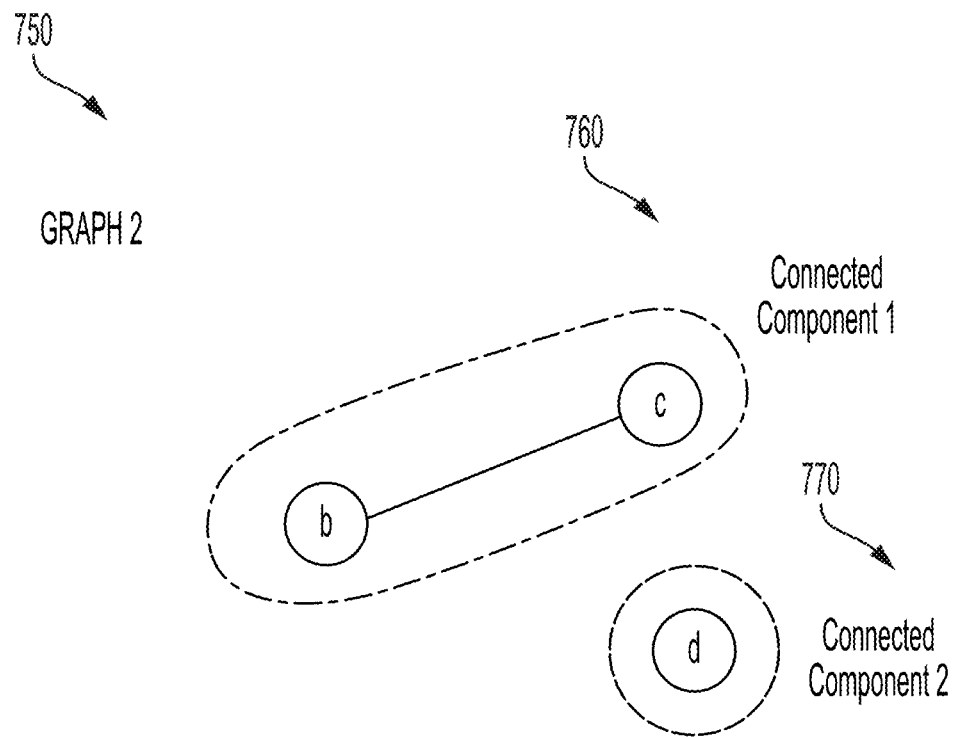

At block 606, connected components are computed for the graph built in block 604. For example, as shown in FIGS. 7A and 7B, the connected components include trajectory $T_a$ in the first graph 700, trajectories $T_b$ and $T_c$ in a second graph 750 and trajectory $T_d$ in graph 770. At block 608, the selected tolerance relation is removed from the list of tolerance relations. At block 610, it is determined whether the list of tolerance relations is empty. If the list of tolerance relations is empty, the method 600 terminates; otherwise control flow branches to block 604 and blocks 604 to 608 are repeated until the list of tolerance relations is empty.

As shown in FIG. 6, the method 600 operates according to a given list of tolerance relations and a set of trajectories. Considering a selected tolerance relation from the list of tolerance relations, a graph is built, having one node for each trajectory and an edge between two nodes if the tolerance relation holds true for the pair of corresponding trajectories. For example, as shown in FIG. 7A, the Similar (x, y) tolerance relation is selected. The Similar (x, y) tolerance relation is true if x and y have the same number of 'c' actions and their positions in the description differs at most of 1 place. For example, comparing trajectories $T_b$ and $T_c$, the Similar (x, y) tolerance relation is true (e.g., Similar (b, c)=true). Similarly, comparing trajectories $T_c$ and $T_d$, the Similar (x, y) tolerance relation is true (e.g., Similar (c, d)=true). Comparing trajectories $T_a$ and $T_c$, however, the Similar (x, y) tolerance relation is false (e.g., Similar (a, c)=false) because the position of the (c) action differs by two places.

As shown in FIG. 7B, the Close (x, y) tolerance relation is selected. The Close (x, y) tolerance relation is true if the final points of x and y are closer than 5 meters. For example, comparing trajectories $T_c$ and $T_b$, the Close (x, y) tolerance relation is true (e.g., Close (c, b)=true). Comparing trajectories $T_c$ and $T_d$, the Close (x, y) tolerance relation, however, is false (e.g., Close (c, d)=false). Similarly, comparing trajectories $T_a$ and $T_b$, the Close (x, y) tolerance relation is false (e.g., Close (a, b)=false).

The process of the method 600 may be performed as shown in FIGS. 7A and 7B as follows. For example, the process builds a graph in which each node represents a trajectory and provides an edge if the selected tolerance relation Similar (x, y) is true. The process identifies the connected components of a first graph 700 (GRAPH 1), as shown in FIG. 7A. In this example, first connected component 710 (e.g., Connected component 1) includes the trajectory $T_a$ because no other operations are performed besides the lane change (c). In this example, because no further operations are specified, trajectory $T_a$ represents a homotopy class. Furthermore, consider the trajectories in the second connected component 720 (e.g., Connected component 2). In this example, the process generates a graph having edges connecting trajectory $T_b$ to $T_c$ and $T_c$ to $T_d$ because the selected tolerance relations Similar (b, c) and Similar (c, d) are true, as noted above.

As shown in FIG. 7B, the process identifies the connected components of a second graph 750 (e.g., GRAPH 2) as follows. In this example, first connected component 760 (e.g., Connected component 1) includes the trajectories $T_b$ and $T_c$. In this example, the process generates a graph having an edge connecting trajectory $T_b$ to $T_c$ because the selected tolerance relation Close (b, c) is true, as noted above. In this example, because the selected tolerance relation Close (x, y) is false for combinations including the trajectory $T_d$, the trajectory $T_d$ represents a homotopy class and trajectories $T_b$ and $T_c$ are equivalent maneuvers representing a homotopy class. Because there are no other tolerance criteria, the process is terminated by the system and the following homotopy classes of operations are identified: (1) O1={a}; (2) O2={b, c}; and O3={d}. The solutions for the simplified scenario may be mapped as: (1) change lanes before the roadwork; (2) change lanes after the roadwork behind the slow car; and (3) change lanes after the roadwork and after the slow car.

Figure 8:
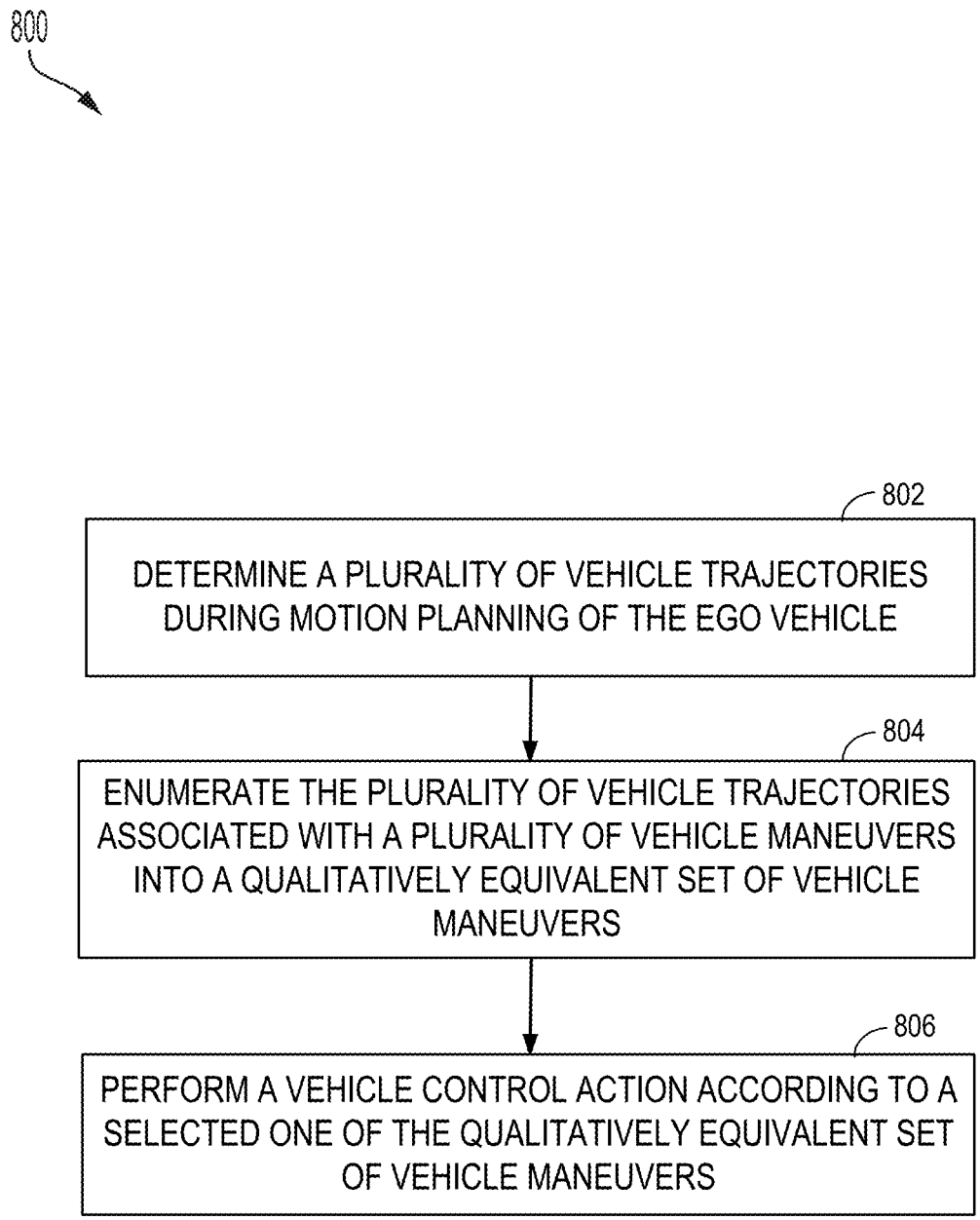
FIG. 8 is a flowchart illustrating a method of motion planning and maneuvering of an ego vehicle, according to aspects of the present disclosure.

FIG. 8 is a flowchart illustrating a method for motion planning and maneuvering of an ego vehicle, according to aspects of the present disclosure. A method 800 begins at block 802, in which a plurality of vehicle trajectories are determined during motion planning of the ego vehicle. For example, FIG. 5 illustrates four possible maneuvers [are] shown as vehicle trajectories $T_a$, $T_b$, $T_c$, and $T_a$ during motion planning of the ego vehicle 520. The method 800 is further described with references to trajectory graphs shown in FIGURE-FIGS. 7A and 7B for determining a homotopy class, according to aspects of the present disclosure.

At block 804, the plurality of vehicle trajectories associated with a plurality of vehicle maneuvers are enumerated into a qualitatively equivalent set of vehicle maneuvers. For example, as shown in FIG. 5, the trajectories (e.g., $T_a$, $T_b$, $T_c$, and $T_d$) have both a set of points and a "discrete description" of the actions performed by the ego vehicle 520 to achieve the trajectory. In this example, two tolerance relations are described to enumerate the maneuver homotopies: (1) Similar (x, y); and (2) Close (x, y). Similar (x, y) is a first tolerance relation specifying trajectories are similar if x and y have the same number of 'c' actions and their positions in the description differ at most by one place. Close (x, y) is the second tolerance relation specifying that trajectories are close if x and y have final points that are closer than five meters.

At block 806, a vehicle control action is performed according to a selected one of the qualitatively equivalent set of vehicle maneuvers. For example, as shown in FIG. 5, the vehicle control action is selected according to a fourth trajectory. A forth-fourth maneuver involves the trajectory Td, in which the ego vehicle 520 changes lanes after the roadwork (e.g., the obstruction 502) and after the slow moving vehicle 560 and continues in the left lane (e.g., the second lane 514). In this example, the trajectory $T_d$ includes the actions of continuing straight(s), continuing straight(s), continuing straight(s), continuing straight(s), and a lane change (c), such that $T_d$={s, s, s, s, c}.

In some aspects, the methods shown in FIGS. 6 and 8 may be performed by the SOC 100 (FIG. 1) or the software architecture 200 (FIG. 2) of the autonomous vehicle 150. That is, each of the elements or methods may, for example, but without limitation, be performed by the SOC 100, the software architecture 200, the processor (e.g., CPU 102) and/or other components included therein of the autonomous vehicle 150, or the vehicle behavior control system 300.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of motion planning and maneuvering of an ego vehicle, the method comprising:
   determining a plurality of vehicle trajectories during operation of the ego vehicle according to monitoring dynamics of both vehicles and obstructions in a multilane roadway based on visible lane markings of the multilane roadway;
   enumerating the plurality of vehicle trajectories associated with a plurality of vehicle maneuvers into a reduced set of qualitatively equivalent vehicle trajectories, comprising homotopy classes of the vehicle trajectories by:
   organizing each of the plurality of vehicle trajectories in a respective node;
   connecting pairs of the respective nodes through a bidirectional edge when a tolerance relation is satisfied by a similar number of actions and positions performed to achieve the respective vehicle trajectories and/or a predetermined distance between a final position of the respective vehicle trajectories associated with the pair of nodes;
   identifying the reduced set of qualitatively equivalent vehicle trajectories according to connected components from the bidirectional edge connected nodes;
   selecting a vehicle trajectory from the reduced set of qualitatively equivalent vehicle trajectories; and
   adjusting the selected trajectory and a speed of the ego vehicle based on a collision avoidance function.

2. The method of claim 1, in which enumerating the plurality of vehicle trajectories comprises:
   selecting a tolerance relation from a list of tolerance relations;
   generating a tolerance relation graph, from the tolerance relation graphs, having a node for each of the plurality of vehicle trajectories and the series of actions performed to achieve the respective vehicle trajectory;
   adding an edge between two nodes if a selected tolerance relation is true based on the series of actions performed to achieve the respective vehicle trajectory for each of the plurality of vehicle trajectories corresponding to the two nodes;
   computing the connected components from the graph to identify the qualitatively equivalent set of vehicle trajectories; and
   removing the selected tolerance relation from the list of tolerance relations.

3. The method of claim 2, further comprising repeating the selecting, generating, adding, computing, and removing until the list of tolerance relations is empty.

4. The method of claim 1, in which the homotopy classes of operations comprise changing lanes before roadwork, changing lanes after the roadwork behind a slow car; and/or changing lanes after the roadwork and after the slow car.

5. The method of claim 1, further comprising:
avoiding an obstruction and at least one moving vehicle detected in a lane of the multilane roadway on which the ego vehicle is traveling, in which the ego vehicle is in a first lane of the multilane roadway and a target lane is a second lane of the multilane roadway.

6. A non-transitory computer-readable medium having program code recorded thereon for motion planning and maneuvering of an ego vehicle, the program code being executed by a processor and comprising:
program code to determine a plurality of vehicle trajectories during operation of the ego vehicle according to program code to monitor dynamics of both vehicles and obstructions in a multilane roadway based on visible lane markings of the multilane roadway;
program code to enumerate the plurality of vehicle trajectories associated with a plurality of vehicle maneuvers into a reduced set of qualitatively equivalent vehicle trajectories, comprising homotopy classes of the vehicle trajectories by:
program code to organize each of the plurality of vehicle trajectories in a respective nodes;
program code to connect pairs of the respective nodes through a bidirectional edge when a tolerance relation is satisfied by a similar number of actions and positions performed to achieve the respective vehicle trajectories and/or a predetermined distance between a final position of the respective vehicle trajectories associated with the pair of nodes;
program code to identify the reduced set of qualitatively equivalent vehicle trajectories according to connected components from the bidirectional edge connected nodes;
program code to select a vehicle trajectory from the reduced set of qualitatively equivalent vehicle trajectories; and
program code to adjust the selected trajectory and a speed of the ego vehicle based on a collision avoidance function.

7. The non-transitory computer-readable medium of claim 6, in which the program code to generate the tolerance relation graphs comprises:
program code to select a tolerance relation from a list of tolerance relations;
program code to generate a tolerance relation graph having a node for each of the plurality of vehicle trajectories and the series of actions performed to achieve the respective vehicle trajectory;
program code to add an edge between two nodes if a selected tolerance relation is true based on the series of actions performed to achieve the respective vehicle trajectory for each of the plurality of vehicle trajectories corresponding to the two nodes;
program code to compute the connected components from the graph to identify the qualitatively equivalent set of vehicle trajectories; and
program code to remove the selected tolerance relation from the list of tolerance relations.

8. The non-transitory computer-readable medium of claim 7, further comprising program code to repeat the program code to select, the program code to generate, the program code to add, the program code to compute, and the program code to remove until the list of tolerance relations is empty.

9. The non-transitory computer-readable medium of claim 6, in which the homotopy classes of operations comprise changing lanes before roadwork, changing lanes after the roadwork behind a slow car; and/or changing lanes after the roadwork and after the slow car.

10. The non-transitory computer-readable medium of claim 6, further comprising:
program code to avoid an obstruction and at least one moving vehicle detected in a lane of the multilane roadway on which the ego vehicle is traveling, in which the ego vehicle is in a first lane of a multilane roadway and a target lane is a second lane of the multilane roadway.

11. A system for motion planning and maneuvering of an ego vehicle, the system comprising:
a vehicle trajectory/tolerance module to determine a plurality of vehicle trajectories during operation of the ego vehicle according to monitoring dynamics of both vehicles and obstructions in a multilane roadway based on visible lane markings of the multilane roadway;
a vehicle maneuver enumeration module to enumerate the plurality of vehicle trajectories associated with a plurality of vehicle maneuvers into a reduced set of qualitatively equivalent vehicle trajectories, comprising homotopy classes of the vehicle trajectories to organize each of the plurality of vehicle trajectories in respective nodes, to connect pairs of the respective nodes through a bidirectional edge when a tolerance relation is satisfied by a similar number of actions and positions performed to achieve the respective vehicle trajectories and/or a predetermined distance between a final position of the respective vehicle trajectories associated with the pair of nodes, and identify the reduced set of qualitatively equivalent vehicle trajectories according to connected components from the bidirectional edge connected nodes;
a vehicle control selection module to select a vehicle trajectory from the reduced set of qualitatively equivalent vehicle trajectories; and
adjust the selected trajectory and a speed of the ego vehicle based on a collision avoidance function.

12. The system of claim 11, further comprising a vehicle perception module to identify the obstruction and/or a slow moving vehicle in a second lane of the multilane roadway, in which the ego vehicle is in a first lane of the multilane roadway and a target lane is the second lane of the multilane roadway.

13. The system of claim 11, further comprising:
a planner to plan the trajectory of the ego vehicle according to a vehicle control action; and
a controller to adjust the selected trajectory and a speed of the ego vehicle based on a collision avoidance function, and to avoid an obstruction and at least one moving vehicle detected in a lane of the multilane roadway on which the ego vehicle is traveling.

* * * * *